Patented June 10, 1947

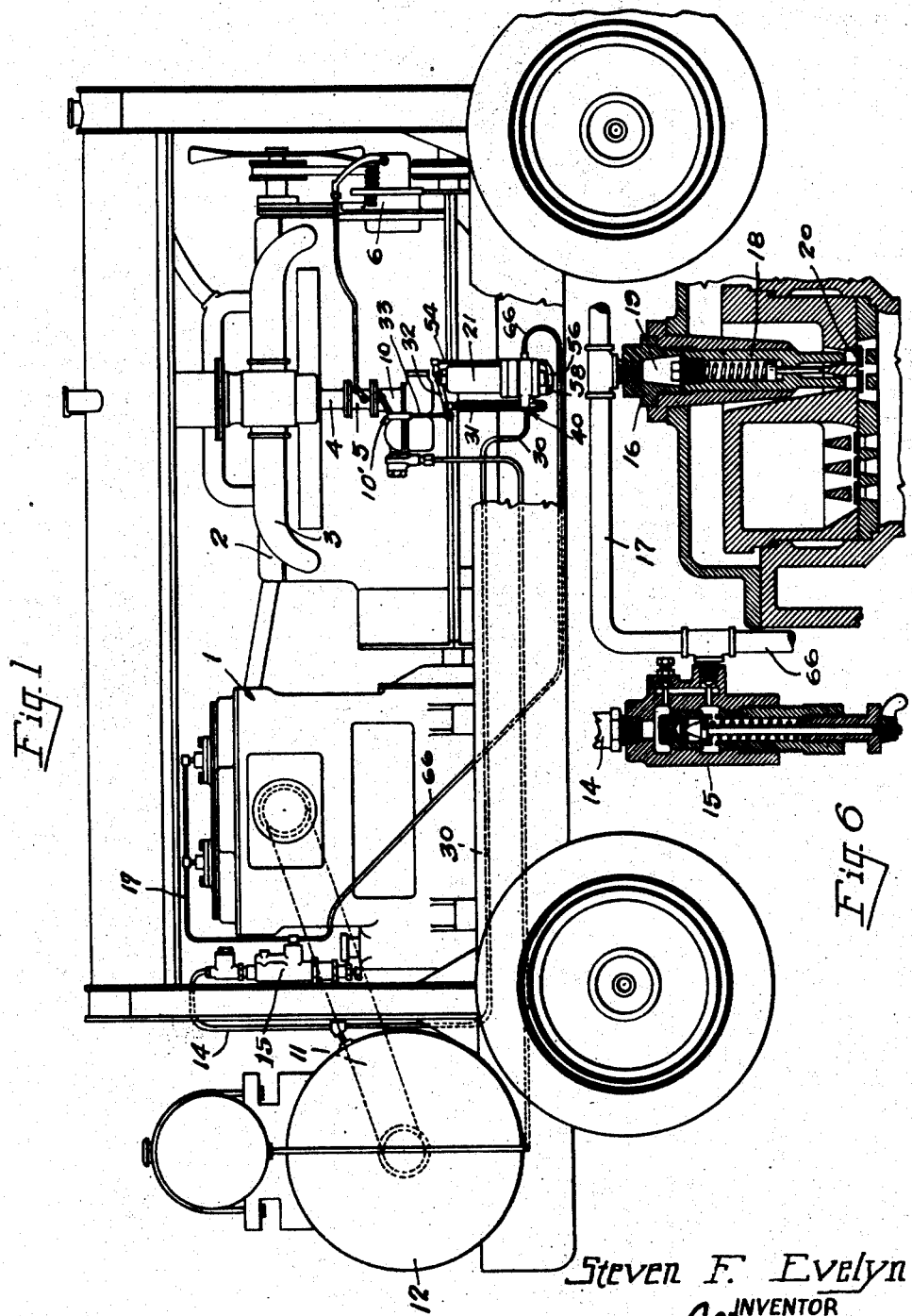

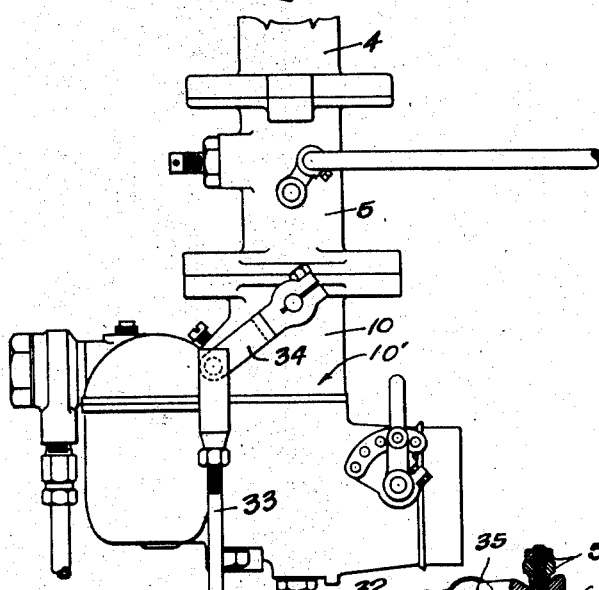

2,421,872

UNITED STATES PATENT OFFICE 2,421,872

COMPRESSOR REGULATOR

Steven F. Evelyn, Southampton, Mass., assignor to Worthington Pump and Machinery Corporation, Harrison, N. J., a corporation of Delaware Application February 11, 1944, Serial No. 521,913

22 Claims. (Cl. 230—9)

This invention relates to control apparatus or regulators for internal combustion engine driven compressors, and more particularly to control apparatus for regulating the speed of operation of the engine in conformance with the load demand on the compressor.

Compressor units of the type with which the regulator or control apparatus of the present invention is employed comprise a compressor driven by an internal combustion engine. The fluid compressed is discharged by the compressor into a storage tank or receiver from which it is taken to perform the desired work, such as operating percussive tools or the like, and in the greater percentage of jobs on which a compressor unit of this type is employed the load demand is irregular, fluctuating widely at varying intervals. Control of the compressor is provided by unloading mechanism, which unloads the compressor when the pressure in the receiver reaches a predetermined high degree, and loads the compressor when the pressure falls below a predetermined low degree, that is, the degree of pressure required for performing the desired work. When the compressor is unloaded, the engine is slowed to the minimum or idling rate of speed; and when the compressor is loaded, the engine speed is increased to the maximum speed.

Under certain load conditions, the compressor will unload and load at frequent intervals and the engine will be decelerated and accelerated accordingly, resulting in an unsteady and uneconomical operation of the unit.

An object of the present invention is therefore to provide means whereby the speed of operation of the engine will be automatically controlled to operate the compressor unit at the most economical speed which will satisfy the load conditions on the unit and prevent operation of the unit at a speed in excess of that required by the load on the compressor.

Another object of the present invention is to provide a modulating control of the speed of operation of the engine whereby its speed and, consequently, the speed of operation of the compressor unit is progressively regulated by the compressor discharge pressure, and further to provide means whereby when the compressor is unloaded the engine will be operated at a predetermined minimum speed.

A further object of the present invention is to provide regulating means for regulating the speed of operation of the engine or motor by pressure conditions of the compressor discharge which regulating means operates independently of a governor actuated speed control means of the engine.

With these and other objects in view, as may appear from the accompanying specification, the invention consists of various features of construction and combination of parts, which will be first described in connection with the accompanying drawings, showing a compressor regulator of a preferred form embodying the invention, and the features forming the invention will be specifically pointed out in the claims.

In the drawings:

Figure 1 is a side elevation of a portable internal combustion engine driven compressor unit showing the improved regulator mechanism applied thereto.

Figure 2 is a view partly in side elevation and partly in vertical section of the improved regulating mechanism.

Figure 3 is a cross-section taken on the line 3—3 of Figure 2.

Figure 4 is a cross-section taken on the line 4—4 of Figure 2.

Figure 5 is a fragmentary vertical section taken at right angles to the section shown in Figure 2 and also taken on the line 5—5 of Figure 2.

Figure 6 is a fragmentary section showing the conventional compressor unloading mechanism.

Referring more particularly to the drawings, the portable compressor unit comprises a compressor 1 of the reciprocating piston type which may be of any approved construction well known in the art and purchasable upon the open market. The compressor 1 is driven by an internal combustion engine 2 which likewise is of any approved type which may be purchased upon the open market and which receives its operating fuel through an intake manifold, delivering to the intake manifold of the combustible mixture through a suitable intake pipe 4 in which is positioned the usual type of butterfly throttle valve (not shown) indicated at 5. The throttle valve 5 is operated from the governor mechanism 6 of the engine which is the conventional type of governor mechanism and provides for the control of the combustion mixture to the engine for regulating its speed of operation.

The present invention comprises a second or auxiliary butterfly throttle valve 10 incorporated in the fuel passage of the carburetor structure 10', which throttle valve is operated independently of the governor controlled throttle valve 5 and is, in fact, controlled through suitable mechanism forming the present invention by the discharge pressure of the compressor 1.

The compressor 1 discharges through a suitable discharge 11 into the storage tank or receiver 12, as is customary, and from which receiver pressure fluid is drawn to perform the desired work.

As is usual in portable compressor units of this type, the discharge pressure and operation of the compressor is controlled by the pressure in the receiver 12 and thus when the pressure within the receiver, that is, the discharge pressure of the compressor, reaches a predetermined high, a small quantity of the pressure fluid bleeding from the receiver 12 through the pipe or connection 14 will actuate the trigger valve 15. The trigger valve 15 which is of a conventional, well-known type being clearly shown in prior Patent No. 1,150,915 and is tensioned so that when the pressure of the fluid being delivered thereto through the pipe 14 reaches a predetermined high degree the trigger valve 15 will operate to admit the pressure fluid therethrough and to the unloading mechanism 16 through the connection 17. The unloading mechanism 16 is of a conventional type, that being shown in Figure 6 of the drawings comprising a tensioned piston 18 which when pressure fluid is delivered to the cylinder 19 will be forced inwardly to unseat and hold open the discharge valve 20 of a compressor for the purpose of unloading the compressor by permitting the air compressed thereby to be passed back and forth through the compressor.

All of the foregoing described mechanism is old in the art and is well known.

The regulating mechanism for regulating the speed of operation of the engine and consequently the compressor in proportion with the load demand comprises a cylinder 21 in which a piston 22 is mounted with limited reciprocatory movement. The movement of the piston 22 is limited by the stop shoulders 23 and 24 formed in the wall structure of the cylinder 21. The piston 22 is urged against the stop 24 by a spring 25 which is tensioned to a predetermined degree necessary to provide a sensitive, highly balanced control for the second throttle valve 10. The piston 22 carries a piston rod 26 which extends through the piston and has a head 27 carried by the end thereof adjacent to the piston 22. The head 27 is rigidly connected to the piston 22 and engages a diaphragm 28. The diaphragm 28 extends across a chamber 29 formed in the cylinder structure 21. The chamber 29 is connected to the receiver 12 into which the compressor discharges by a suitable pipe or conduit 30 so that this chamber 29 always receives pressure fluid at the discharge pressure of the compressor 1. The pressure of the pressure fluid in the chamber 29 acts upon the diaphragm 28 to move the piston 22 upwardly against the tension of the spring 25 and against the tension of the adjustable modulating control spring 31 which is connected to the lever 32. The lever 32 has linkage connection by means of the links 33 and 34 with the throttle valve 10 for operating the throttle valve. The lever 32 is pivotally supported upon a pivot 35 carried by the cylinder 21, and it has a slip joint coupling member 36 pivotally connected thereto between the pivot 35 of the lever and the point of connection 37 of the lever with the link 33. The slip coupling 36 has a cylindrical bore 38 which slidably receives the upper end of the piston rod 26 so that when the piston 22 is urged or moved upwardly sufficiently to cause contact of the end of the piston rod 26 with the inner end of the bore 38 and is further moved upwardly it will cause upward movement of the portion of the lever 32 between the pivot 35 and its point of connection 37 to the link 33 resulting in a closing movement of the throttle valve 10 with a consequent retarding of the supply of fuel to the internal combustion engine 2. As the pressure of the fluid in the chamber 28 recedes, the piston will be moved downwardly by action of the spring 25, and the piston rod or stem 26 will slide in the bore 38, and consequently will not effect movement of the lever 32. The lever 32 will, however, be returned or moved downwardly by action of the spring 31.

The spring 31 is pivotally connected by a suitable coupling 39 to the lever 32 outwardly of the pivot 35 and the point of connection of the coupling 36 with the lever. The lower end of the spring 31 is engaged by a tension adjusting structure 40 which is preferably supported from the cylinder 21 in any suitable manner such as by means of the brackets 41 and set screws 42. The tension adjusting mechanism 40 comprises a cage 43 in which is mounted, for vertical movement, a spring engaging nut 44 which is threaded on the coils of the spring 31 and is held against rotation by means of ribs 45 which engage in vertically extending annular grooves 46 formed in the cage 43. An adjusting screw 47 is carried by the cage 43 and is threadably connected to the nut or member 44 so that by turning of the adjusting screw 47 the tension of the spring 31 may be varied.

The nut 44 functions as a secondary adjustment which provides a change in the rate of the spring 31 by increasing or decreasing the number of inactive coils in the spring. The inactive coils are shown beneath the nut 44 in Figures 2 and 5. Such spring rate adjustment is desirable in overcoming commercial variations in the control spring, thus making the device uniformly sensitive to predetermined pressure ranges. It is understood that the coils of the spring 31 below the nut 44 are rendered inactive insofar as their action upon the lever 32 is concerned. If the throttle 10 closes too suddenly, or too slowly, this action can be corrected by changing the number of active coils of the spring 31 through adjustment of the nut 44. Adjustment of the number of active coils of the spring 31 adjusts the deflection of the spring per unit load, and deflection of this spring 31 controls the position of the throttle valve 10 through the lever 32 and linkage 33 and 34.

Owing to the desired sensitivity to pressure variances of the regulating mechanism, it is highly desirable that friction in the movement of the various elements, and particularly of the piston 22, be reduced to the highest possible minimum and practically eliminated, and for this purpose a novel device or structure is provided to provide positive centered, substantially frictionless movement of the piston 22. By reference to Figure 2 of the drawings, it will be noted that the perimeter of the piston 22 is spaced from the facing wall of the cylinder 21 thus eliminating friction between the piston and the cylinder upon movement of the piston. However, to insure sensitive, accurate operation of the mechanism it is necessary that the piston be accurately centered. A disc 48 is carried by the head structure 27 and consequently is rigidly connected to the piston 22. The disc 48 is provided with a plurality of circumferentially spaced peripheral recesses 49 in each of which is mounted a bearing ball 50. As shown in Figure 3 of the drawings, the recesses are slightly wider than the diameter of the bearing balls 50, and the bearing balls are supported at the inner ends of the recesses by reduced bearing surfaces 51 thus permitting limited movement of the bearing balls 50 in the recesses 49. The bearing balls 50 engage the inner wall of the cylinder 21 and they are held against dislodgement from the recesses 49, which as shown in Figure 2 of the drawings, extend out through the sides of the disc 48, by resilient spiders 52 one of which is placed upon each side of the disc 48. The spiders 52 comprise a plurality of radiating flat spring arms 53 gradually decreasing in width towards their outer free ends. The outer free ends of the arms 53 engages the bearing balls 50 so as to yieldably hold them in position with respect to the disc 48, and, consequently, with respect to the piston 22 and yet permit limited movement of the bearing balls relative to the disc and the cylinder for the purpose of eliminating friction and for accurately centering the piston 22 at all times.

The foregoing structure provides a modulating speed control of the engine in accordance with variations in the load demand on the compressor, that is, in accordance with variations in the discharge pressure of the compressor so as to prevent excessive speeding of the engine and compressor at predetermined times, and to provide the most economical operation of the engine in that it will be operated only at the speed required to provide the necessary discharge pressure of the compressor to meet the fluctuating load demand, and thus the number of times that the unit is stopped and started and the compressor unloaded and loaded will be very materially reduced, since without the modulated control just described the compressor would operate until the maximum high pressure was provided in the receiver at which time the compressor would unload to be loaded again when the pressure in the receiver fell below the required load demand.

However, there will be times when the load demand on the compressor will fall below the degree provided by the modulating control just described, and so as to prevent racing of the engine when the compressor is unloaded by action of the trigger valve 15, mechanism is provided for operating the throttle valve 10 independently of movement of the piston 22. This mechanism comprises a rod 54, the upper end of which is connected by a slip joint structure 55 to the end of the lever 32 on the opposite side of its pivot 35 from the end which is connected to the link 33. The lower end of the rod 54 is connected to a pivotally mounted arm 56. Adjustable nuts 57 are provided adjusting the slip joint connection 55.

The arm 56 is pivotally supported at 58 on an extension or bracket 59 depending from the cylinder 21 and it has a contact surface 60 formed thereon intermediate its ends which is held into engagement with the stem 61 of a piston head 62 by means of a spring 63. The piston head 62 is engaged by a diaphragm 64 which extends across the chamber 65 formed in the lower end of the cylinder 21. The chamber 65 is connected by suitable piping 56 to the outlet piping or opening of the trigger valve 15 and through the trigger valve 15 and piping 14 to the receiver 12 so that when the compressor 1 is unloaded by action or operation of the trigger valve 15 fluid under pressure will be delivered to the chamber 65, and acting upon the diaphragm 64 will move the piston head 62 and its stem 61 and consequently rock the arm 56 upon its pivot to move the rod 54, rock the lever 32, and move the throttle valve 10 to reduce the quantity of fuel delivered to the engine, and, in fact, to cause the engine to operate at its idling speed.

When the compressor is loaded by action of the trigger valve 15, the supply of pressure fluid to the chamber 65 will be cut off, and the modulating control mechanism will come into effect through the action of the pressure fluid in the chamber 29. The provision of the slip joint 55, and the slip joint connection between the piston stem or rod 26 and the lever 32 will permit independent, unimpeded operation of the mechanism for operating the second throttle valve 10.

It will be understood that the invention is not to be limited to the specific construction or arrangement of parts shown, but that they may be widely modified within the invention defined by the claims.

What is claimed is:

1. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, means to unload the compressor at a predetermined maximum high discharge pressure and to load the compressor at a predetermined low discharge pressure, pressure actuated means operable when the compressor is unloaded to move said second throttle valve to and maintain it at a predetermined minimum speed position, and means providing a slip joint in said pressure actuated means operable to maintain the predetermined minimum speed so as to prevent its interference with operation of the modulating speed control.

2. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a piston acted upon by discharge pressure of the compressor, and means providing a slip joint connection between said piston and lever.

3. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a piston acted upon by discharge pressure of the compressor, means providing a slip joint connection between said piston and lever, means to unload the compressor at a predetermined maximum high discharge pressure and to load the compressor at a predetermined low discharge pressure, a second pressure actuated means, said compressor unloading and loading means controlling delivery of actuating pressure fluid to said second pressure actuated means, and means connecting said second pressure actuated means to said lever to move said second throttle to and maintain it at a predetermined maximum speed when the compressor is unloaded.

4. In a speed regulator for an engine driven fluid compressor unit having a governor and a throttle valve controlled by the governer, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a piston acted upon by discharge pressure of the compressor, means providing a slip joint connection between said piston and lever, means to unload the compressor at a predetermined maximum high discharge pressure and to load the compressor at a predetermined low discharge pressure, a second pressure actuated means, said compressor unloading and loading means controlling delivery of actuating pressure fluid to said second pressure actuated means, means connecting said second pressure actuated means to said lever to move said second throttle to and maintain it at a predetermined maximum speed when the compressor is unloaded, said connecting means constructed and arranged to permit movement of said lever by said piston unimpeded by action of said second pressure actuated means.

5. In a speed regulator for an engine driven fluid compressor unit having a governor and a throttle valve controlled by the governer, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, and tensioning means connected to said lever to apply a predetermined tension to the lever in opposition to the movement of the lever by said piston.

6. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, tensioning means connected to said lever to apply a predetermined tension to the lever in opposition to the movement of the lever by said piston, and adjustable means for regulating the tension applied to said lever.

7. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, tensioning means connected to said lever to apply a predetermined tension to the lever in opposition to the movement of the lever by said piston, and stop means formed in said cylinder for limiting movement of said piston.

8. In a speed regulator for an engine driven fluid compressor unit having a governor and a throttle valve controlled by the governor of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, tensioning means connected to said lever to apply a predetermined tension to the lever in opposition to the movement of the lever by said piston, and a frictionless and universal centering device carried by said piston and engaging said cylinder.

9. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, tensioning means connected to said lever to apply a predetermined tension to the lever in opposition to the movement of the lever by said piston, a frictionless and universal centering device carried by said piston and engaging said cylinder, said piston being free from peripheral engagement with said cylinder, said frictionless and universal centering device comprising a carrying body having a plurality of circumferentially spaced recesses in its perimeter, bearing balls in said recesses, and spring members engaging said bearing balls upon each side of said carrying body to yieldably maintain the balls in position to provide a frictionless and universal centering of the piston in the cylinder.

10. In a speed regulator for an engine driven fluid compressor unit having a governor and a throttle valve controlled by the governor, of a second throttle valve operable independently of the governor controlled throttle valve, and a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, means connecting said piston to said lever, means applying a predetermined initial tension on said piston, means to unload the compressor at a predetermined maximum high discharge pressure and to load the compressor at a predetermined low discharge pressure, a second pressure actuated means, said compressor unloading and loading means controlling delivery of actuating pressure fluid to said second pressure actuated means, and means connecting said second pressure actuated means to said lever to move said second throttle tension and maintain it at a predetermined minimum speed when the compressor is unloaded.

11. In a speed regulator for an engine driven fluid compressor unit having a governor and a throttle valve controlled by the governor, of a second throttle valve operable independently of the governor controlled throttle valve, a pressure actuated modulating speed control device operable upon variances in the discharge pressure of the compressor to vary the setting of said second throttle valve to regulate the speed of operation of the engine and compressor in response to variances in the discharge pressure of the compressor, said modulating speed control device including a pivotally mounted operating lever, linkage connecting said lever to said second throttle, a cylinder, a piston in said cylinder, means actuated by discharge pressure of the compressor for moving said piston in said cylinder, and means providing a slip joint connection between said piston and lever.

12. In a speed regulator for an engine driven fluid compressor having a throttle valve controlled by the governor, of a second throttle valve operable independently of the governor controlled throttle valve, a pivoted lever, linkage connecting said lever to said second throttle valve, a piston connected to said lever on one side of its pivot, means for moving said piston under fluctuations in discharge pressure of the compressor, means to unload the compressor at predetermined maximum high pressure and to load the compressor at predetermined low pressure, means connected to said lever at the side of its pivot opposite to the side to which said piston is connected, pressure actuated means for moving said last-named means, and a pressure fluid delivering conduit connecting said pressure actuated means and said compressor loading and unloading means whereby the compressor loading and unloading means will control operation of the pressure actuated means.

13. In a speed regulator for an engine driven fluid compressor having a throttle valve controlled by the governor, of a second throttle valve operable independently of the governor controlled throttle valve, a pivoted lever, linkage connecting said lever to said second throttle valve, a piston connected to said lever on one side of its pivot, means for moving said piston under fluctuations in discharge pressure of the compressor, means to unload the compressor at predetermined maximum high pressure and to load the compressor at predetermined low pressure, an operating rod connected to said lever at the side of its pivot opposite to the side to which said piston is connected, pressure actuated means for moving said rod, a pressure fluid delivery conduit connecting said pressure actuated means and said compressor loading and unloading means whereby the compressor loading and unloading means will control operation of the pressure actuated means, means providing a slip connection between said piston and lever, and means providing a slip connection between said rod and lever.

14. In a speed regulator for an engine driven fluid compressor having a throttle valve controlled by the governor, of a second throttle valve operable independently of the governor controlled throttle valve, a pivoted lever, linkage connecting said lever to said second throttle valve, a piston connected to said lever on one side of its pivot, means for moving said piston under fluctuations in discharge pressure of the compressor, means to unload the compressor at predetermined maximum high pressure and to load the compressor at predetermined low pressure, means connected to said lever at the side of its pivot opposite to the side to which said piston is connected, pressure actuated means for moving said last-named means, a pressure fluid delivering conduit connecting said pressure actuated means and said compressor loading and unloading means whereby the compressor loading and unloading means will control operation of the pressure actuated means, and tensioning means connected to said lever to apply a predetermined tension to the lever in opposition to movement of the lever by said piston.

15. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston.

16. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, said piston being connected to said lever at one side of its pivot, a rod connected to said lever at the side of its pivot opposite to the side to which the piston is connected, pressure actuated means for moving said rod, and a pressure fluid delivering conduit connecting said pressure actuated means and compressor loading and unloading means whereby the compressor loading and unloading means will control movement of said rod.

17. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, and a frictionless and universal centering device carried by said piston and engaging said cylinder.

18. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, a frictionless and universal centering device carried by said piston and engaging said cylinder, said piston being free from peripheral engagement with said cylinder, said frictionless and universal centering device comprising a carrying body having a plurality of circumferentially spaced recesses in its perimeter, bearing balls in said recesses, and spring members engaging said bearing balls upon each side of said carrying body to yieldably maintain the balls in position to provide a frictionless and universal centering of the piston in the cylinder.

19. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, said piston and lever connecting means being connected to the lever on one side of its pivot, an operating rod connected to said lever at the side of its pivot opposite to the side to which the piston is connected, a second diaphragm carried by said cylinder, means for leading pressure fluid from a point different from and under different control conditions than the point of delivery and control of the pressure fluid which actuates said first diaphragm for actuating said second diaphragm, and means operated by said second diaphragm for operating said rod.

20. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, said piston and lever connecting means being connected to the lever on one side of its pivot, an operating rod connected to said lever at the side of its pivot opposite to the side to which the piston is connected, a second diaphragm carried by said cylinder, means for leading pressure fluid from a point different from and under different control conditions than the point of delivery and control of the pressure fluid which actuates said first diaphragm for actuating said second diaphragm, means operated by said second diaphragm for operating said rod, adjustable means providing a slip connection between said rod and lever, and tensioning means connected to said lever to apply a predetermined tension to the lever in opposition to movement of the lever by said piston.

21. In a speed regulator for an engine driven fluid compressor having a throttle valve controlled by the governor, of a second throttle valve operable independently of the governor controlled throttle valve, a pivoted lever, linkage connecting said lever to said second throttle valve, a piston connected to said lever on one side of its pivot, means for moving said piston under fluctuations in discharge pressure of the compressor, means to unload the compressor at predetermined maximum high pressure and to load the compressor at predetermined low pressure, means connected to said lever at the side of its pivot opposite to the side to which said piston is connected, pressure actuated means for moving said last-named means, a pressure fluid delivering conduit connecting said pressure actuated means and said compressor loading and unloading means whereby the compressor loading and unloading means will control operation of the pressure actuated means, a spiral spring connected to said lever to apply tension to the lever in opposition to its movement by said piston, and adjustable means for regulating the number of the coils of said spiral spring which are active thereby regulating the tension applied to the lever.

22. In a speed regulator for an engine driven fluid compressor having a throttle valve controlled by the governor, of a second throttle valve operable independently of the governor controlled throttle valve, a pivoted lever, linkage connecting said lever to said second throttle valve, a control cylinder, a piston in said cylinder for reciprocatory movement therein, a flexible diaphragm in the cylinder and engaging said piston, a conduit for delivering pressure fluid to said cylinder for actuating said diaphragm to move said piston, tensioned means for opposing operation of said piston by said diaphragm, means connecting said piston to said lever to actuate the lever during movement of the piston in one direction and permit movement of the lever independently of movement of the piston, said piston and lever connecting means being connected to the lever on one side of its pivot, an operating rod connected to said lever at the side of its pivot opposite to the side to which the piston is connected, a second diaphragm carried by said cylinder, means for leading pressure fluid from a point different from and under different control conditions than the point of delivery and control of the pressure fluid which actuates said first diaphragm for actuating said second diaphragm, and means operated by said second diaphragm for operating said rod, a spiral spring connected to said lever to apply tension to the lever in opposition to movement of the lever by said piston, adjustable means for regulating the number of coils of said spiral spring which are active to apply tension to the lever thereby regulating the tension applied to the lever.

STEVEN F. EVELYN.

REFERENCES CITED

The following references are of record in the file of this patent:

UNITED STATES PATENTS

| Number | Name | Date |
| --- | --- | --- |
| 2,286,758 | Nelson | June 16, 1942 |
| 2,023,418 | Gustafson | Dec. 10, 1935 |
| 1,929,887 | Gustafson | Oct. 10, 1933 |
| 2,165,360 | Elliott | July 11, 1939 |
| 1,550,815 | Carpenter | Aug. 25, 1925 |